Oct. 25, 1949. V. T. WATT 2,485,946
FISHING PLUG
Filed Nov. 1, 1945
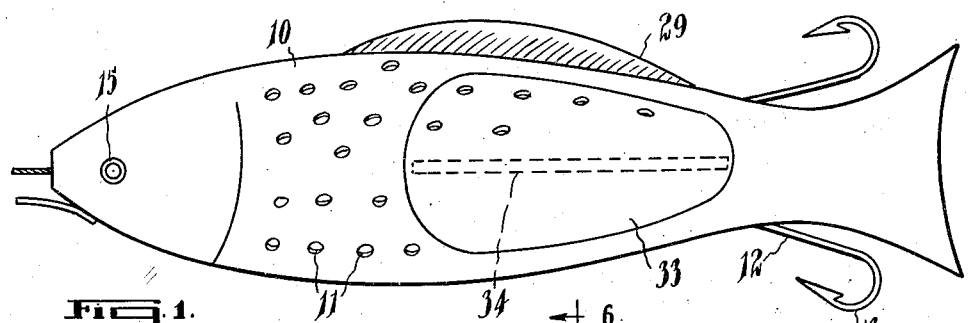
Fig. 1.
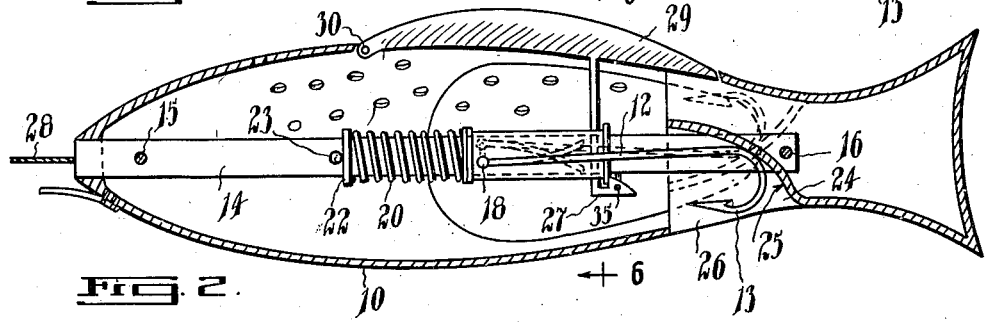
Fig. 2.
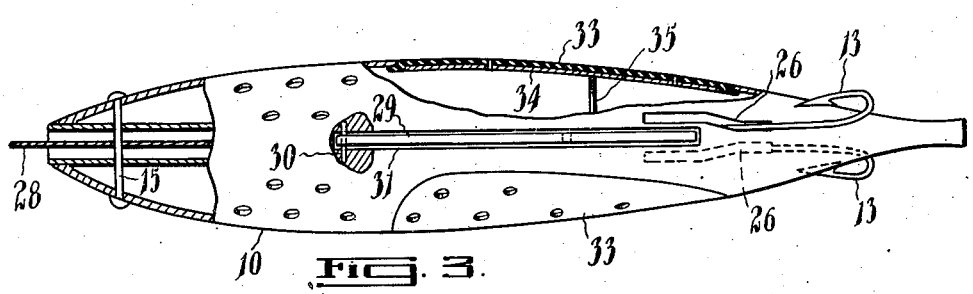
Fig. 3.
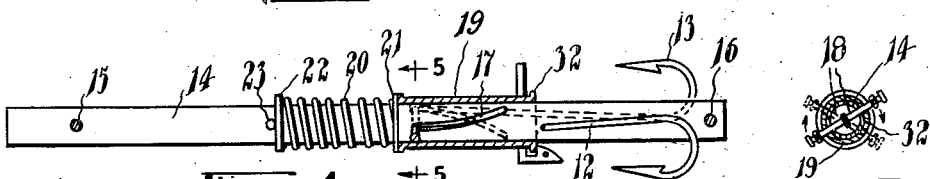
Fig. 4. Fig. 5.
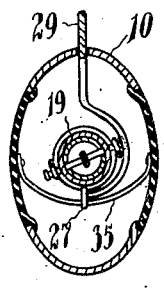
Fig. 6.
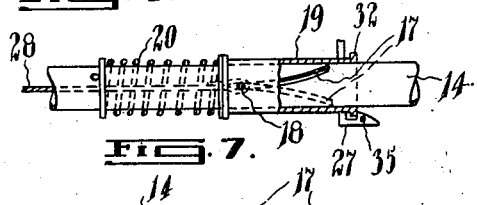
Fig. 7. Fig. 9.
Fig. 8.
Inventor
Victor T. Watt
By Frederick C. Bromley
Atty.

Patented Oct. 25, 1949

2,485,946

UNITED STATES PATENT OFFICE 2,485,946

FISHING PLUG

Victor Thomas Watt, Windsor, Ontario, Canada

Application November 1, 1945, Serial No. 626,078

7 Claims. (Cl. 43—35)

My invention relates to improvements in fish lures and particularly concerns a snagless fishing plug of the type used for casting.

A paramount object of the invention is the provision of a plug of this character having concealed fish hooks which are projected outwardly through the plug body as a fish attempts to seize the lure.

A further object of the invention is the provision of a plug particularly adapted for casting or trolling in which the hooks are disposed internally so that they will not snag upon any object in the water which might result in the loss of the plug, means being provided for automatically projecting the bill portions of the hooks upon depression or compression of an element of the plug-body.

Another object is the provision of a plug in the form of an artificial fish having hooks mounted in it and normally retained against exposure by a mechanism including spring projecting means held in an ineffective position by a detent connected to a depressible element forming a part of the fish-body and operative on depression to disengage the detent so that the bill portion of the hooks will be projected through openings provided in the body.

Another object is the provision of a casting plug having spring-projected hooks which are retracted by a leader or other flexible element for retention by a latching device.

A distinct feature of the invention is that it provides a highly serviceable and efficient fish lure.

Having described the major objects and advantages of the invention, other objects and advantages will be manifest from the ensuing specification of a selected form of the invention illustrated in the accompanying drawing.

In the drawing,

Fig. 1 is a side elevation of the plug showing the hooks in protruding position.

Fig. 2 is a longitudinal section of the plug showing the hooks in their withdrawn position.

Fig. 3 is a top plan view of the plug in which parts are shown in section.

Fig. 4 is a side view partly in section of the mechanism for actuating the hooks.

Fig. 5 is a cross section on line 5—5 of Fig. 4 showing the pin in a second position in dash lines, to which it is turned by the helical slots in the tube.

Fig. 6 is a cross section on line 6—6 of Fig. 2.

Fig. 7 is a view similar to Fig. 4 but omitting the hooks and depicting the cable by which the hooks are withdrawn.

Fig. 8 is a fragmentary detail of the tube illustrating the helical slots for turning the hooks in their outward movement.

Fig. 9 is a fragmentary view on an enlarged scale showing how the hooks are connected to the slide.

In proceeding in accordance with my invention I provide a hollow body 10 simulating a natural fish which may be made up to resemble any species of fish. The body is composed of a suitable material such as metal or plastic to provide a shell whose chamber accommodates the hooks and the mechanism therefor. The shell may be perforated as denoted at 11. The perforations serve to admit water and also to lighten the weight of the plug. The perforations may be located at one region of the body or distributed on the same according to dictates of manufacture.

The hooks of which a pair are shown are of conventional type having a shank 12 terminating in an eye at one end and a bill 13 at the other end. The hooks extend rearwardly one on each side of a slide 14 consisting of a tube axially arranged in the body 10 to extend from the head to the tail thereof. Said tube is fixed in the body as by means of rivets 15 and 16. The rivet 15 preferably extends through the head of the body. The ends of this rivet serve as the eyes of the fish. The tube is supplied with a pair of diametrically opposite slots 17 which extend longitudinally and are of a helical character.

Transversely extending through the slots 17 is a pin 18 which is free to slide therein and which is turned angularly, as indicated in Fig. 5, as it is caused to travel along the slotted portion of the tube. Said pin extends through a sleeve 19 which is slidably mounted on the tube. The ends of said pin project from opposite sides of said sleeve and serve as pivots for said hooks. For this purpose the eye of each shank 12 is swingably fitted on an end of the pin 18 and retained by enlargements in the form of heads. By this arrangement it will be understood that the pin and sleeve move as a unit and carry the hooks which are free to swing outwardly, but have their bills turned inward while in retracted position.

A compression spring 20 is coiled about the tube 14 to urge the sleeve 19 rearwardly. A washer 21 is interposed between one end of the spring and the sleeve. The other end of the spring 20 abuts a washer 22 backed by a shoulder-forming element 23 projecting from the tube.

The bill 13 of each hook is guidably contained in individual ramps 24 at the tail of the body 10. Each ramp has a curved guiding surface 25 for directing the contained bill outwardly through an aperture 26 in the body. The apertures 26 are oppositely disposed, one being at the top of the body and the other at the bottom thereof, and these apertures are in the form of longitudinal openings curved in the direction of their length so that the bill portion of a hook may freely pass through as it is turned outwardly by the helical slots in guiding the pin 18.

A leader or other flexible element is used to withdraw the hooks into the body to their normal positions shown in Fig. 2, in which they are retained by a detent 27 in the form of a latch. Said flexible element is denoted at 28 and is attached to the pin 18, as shown in Fig. 7. It extends through the tube 14 and out of the head end of the body for connection purposes.

The detent is a rigid member arranged transversely of the tube and curved about a side of the sleeve. It is rigidly connected to a depressible plate constituting a fin 29 at the top of the body, which is pivoted at 30 and operably disposed in an opening 31. The free end of the detent has latching engagement with a flange 32 provided on the rear end of the sleeve whereby the pressure exerted by the spring 20 is rendered ineffective until the fin is depressed. The fin thus functions as a releasing agent for the detent.

Additional means are provided by which the detent may be released. The supplementary means comprehends compressible sections of the body. The compressible sections preferably comprise opposite side areas 33 formed of a flexible material yieldably retained as by means of flat strips 34 of spring metal attached in any approved manner. The strips 34 at opposite sides of the body are connected to the ends of a bowed spring wire 35 which has its medial extent connected to the detent.

The plug is used similarly to other bait. In making a cast the hooks are in withdrawn position. When a fish takes a bite which depresses the fin 29 the detent releases the sleeve which is thrust rearwardly by the spring 20 to project the hooks. The pin 18 in travelling along the helical slots 17 turns the hooks so that the bills are turned outwardly. The detent may also be actuated by a bite which compresses the flexible regions of the body, in which case the spring 35 is bowed to greater extent and thereby lowers the detent clear of the flange 32 of the sleeve. The release of the spring 20 serves as a warning to the fisherman that the hooks have been sprung, and the hooks can be retracted after operation by means of the leader or flexible element 28.

It will be apparent that the invention provides an efficient and effective snagless plug and that such changes and modifications of the invention may be resorted to as come within the spirit and scope of the subjoined claims.

What I claim is:

1. In a device of the class described, a chambered body provided with an aperture and compressible side sections, a fish hook including a bill, means mounting the fish hook in said body for ejection of the bill portion thereof through said aperture, a detent engaged with said means to render it ineffective, and flexible means extending from one to the other of said compressible side sections and arranged to be flexed by the simultaneous compression thereof in order to disengage the detent.

2. In a device of the class described, a chambered body provided with side openings, a slide extending axially in said body provided with diametrically opposite slots arranged longitudinally, a pin transversely disposed in said slots for sliding therein, a sleeve slidably mounted on said slide and connected to said pin for movement therewith, fish hooks swingably caried by said sleeve having bills normally disposed within said body and adapted to be thrust outwardly through said openings, ramps for guiding said bills, a spring urging said sleeve for ejection of the bills of the hooks, a detent retaining said sleeve in ineffective position, and means for disengaging said detent.

3. A structure as set forth in claim 2, in which the slide is a tubular member through which the pin extends from one side to the other thereof, and in which a flexible element is secured to the portion of the pin within the bore of said tubular member and extended outwardly of the chambered body so that it can be manually pulled to slide the slide to its ineffective position against the pressure of the spring.

4. A structure as set forth in claim 2, in which the slide is a tubular member having helical slots, and in which the pin projects through the sleeve to swingably carry the fish hooks.

5. A snagless fish lure comprising a hollow body representing a fish, said body having compressible side sections, an element forming a fin pivoted on said body, a tube axially disposed in said body provided with diametrically opposite slots which extend longitudinally and are of a helical character, a transverse pin loosely extending through said slots, a sleeve slidable on said tube through which said pin projects, fish hooks having shanks pivoted on said pin and having bills for projection through openings provided in said body, ramps for guiding said bills, a compression spring encircling said tube and shouldered thereon for urging the sleeve to project said hooks, a detent extending transversely of said tube and rigidly connected to said fin, said detent having latching engagement with said sleeve to render it ineffective, means connecting said compressible side sections to the detent, whereby the detent is disengaged either by depression of said fin or by compression of said side sections, and a flexible element attached to said pin and extending outwardly of said tube.

6. In a device of the class described, a chambered body provided with an aperture and compressible side sections, a fish hook including a bill, means mounting the fish hook in said body for ejection of the bill portion thereof through said aperture, a detent engaged with said means to render it ineffective, and means connected to said compressible side sections, whereby their conjoint compression is operative to disengage the detent, said last mentioned means comprising a bowed spring whose bow is increased with the compression of said side sections.

7. In a device of the class described, a chambered body provided with an opening communicating with its chambered portion, a slide longitudinally supported in said body and having a lengthwise slot, a sleeve slidably mounted on said slide, a pin rigid with said sleeve and loosely engaged in said slot, a fish hook pivoted on said sleeve and having a bill normally disposed within said body and adapted to be thrust outwardly through said opening, a ramp for guiding the bill portion of said hook, a spring biasing said sleeve for ejection of said bill, a detent for retaining said sleeve in ineffective position, and means for disengaging said detent.

VICTOR THOMAS WATT.

REFERENCES CITED

The following references are of record in the file of this patent:

UNITED STATES PATENTS

| Number | Name | Date |
|---|---|---|
| 395,480 | Brewster | Jan. 1, 1889 |
| 610,098 | Sly | Aug. 30, 1898 |
| 1,009,538 | Lowe | Nov. 21, 1911 |
| 1,355,858 | Smith | Oct. 19, 1920 |
| 1,467,750 | Borg | Sept. 11, 1923 |
| 1,670,174 | Wiersma | May 15, 1928 |
| 1,803,561 | Rodin | May 5, 1931 |
| 2,256,088 | Hogan | Sept. 16, 1941 |